United States Patent
Foley

(10) Patent No.: US 8,209,924 B2
(45) Date of Patent: Jul. 3, 2012

(54) CONNECTOR SYSTEM FOR SECURING AN END PORTION OF A STEEL STRUCTURAL MEMBER TO A VERTICAL CAST CONCRETE MEMBER

(75) Inventor: Robert P. Foley, Dayton, OH (US)

(73) Assignee: The Foley Group, LLC, Dayton, OH (US)

( * ) Notice: Subject to any disclaimer, the term of this patent is extended or adjusted under 35 U.S.C. 154(b) by 280 days.

(21) Appl. No.: 12/590,648

(22) Filed: Nov. 12, 2009

(65) Prior Publication Data

US 2011/0107716 A1    May 12, 2011

(51) Int. Cl.
E04B 1/34    (2006.01)
E04B 1/38    (2006.01)
E04B 5/00    (2006.01)
E04B 7/00    (2006.01)

(52) U.S. Cl. ............. 52/289; 52/285.1; 52/702; 52/707; 52/73; 403/403

(58) Field of Classification Search .................... 52/251, 52/272, 283, 285.1, 289, 698, 700, 702, 704, 52/707, 73, 712; 403/403, 353
See application file for complete search history.

(56) References Cited

U.S. PATENT DOCUMENTS

| | | | | |
|---|---|---|---|---|
| 1,872,813 A * | 8/1932 | Reiland | ............ | 52/702 |
| 4,951,438 A | 8/1990 | Thoresen | | |
| 5,548,939 A * | 8/1996 | Carmical | ............ | 52/707 |
| 5,711,122 A * | 1/1998 | Lee | ............ | 52/283 |
| 5,881,519 A | 3/1999 | Newkirk | | |
| 6,213,679 B1 * | 4/2001 | Frobosilo et al. | ............ | 403/403 |
| 6,298,630 B1 | 10/2001 | VeRost et al. | | |
| 6,494,639 B1 * | 12/2002 | Friend | ............ | 403/403 |
| 6,739,099 B2 * | 5/2004 | Takeuchi et al. | ............ | 52/167.1 |
| 7,225,590 B1 * | 6/2007 | diGirolamo et al. | ............ | 52/379 |
| 7,814,710 B2 * | 10/2010 | Foglia | ............ | 52/92.2 |
| 2006/0174565 A1 * | 8/2006 | Lupton | ............ | 52/289 |

FOREIGN PATENT DOCUMENTS

| | | | | |
|---|---|---|---|---|
| JP | 05044268 A | * | 2/1993 | |
| JP | 05171718 A | * | 7/1993 | |
| JP | 06136872 A | * | 5/1994 | |

OTHER PUBLICATIONS

Machine translation of JP 05171718 A, Sep. 26, 2011.*

* cited by examiner

*Primary Examiner* — Jessica Laux
*Assistant Examiner* — Ryan Kwiecinski
(74) *Attorney, Agent, or Firm* — Jacox, Meckstroth & Jenkins

(57) ABSTRACT

A steel structural member such as a joist or beam is secured to a vertical cast concrete member or wall by a connector system including a fabricated steel receiver embedded within the wall. Embedded anchors are attached to the receiver which has front wall portions flush with the concrete wall and define a front opening. A support bracket has a horizontal plate attached to the beam and a vertical plate which fits through the front opening within the receiver. The bracket is attached to the beam which is then elevated, and the vertical plate is inserted through the opening into the receiver. The beam and vertical plate are then shifted until opposite edge portions of the vertical plate are blocked by the front wall portions of the receiver. In the illustrated embodiment, the front opening and vertical plate are generally triangular, and the support bracket has a welded reinforcing gusset.

10 Claims, 2 Drawing Sheets

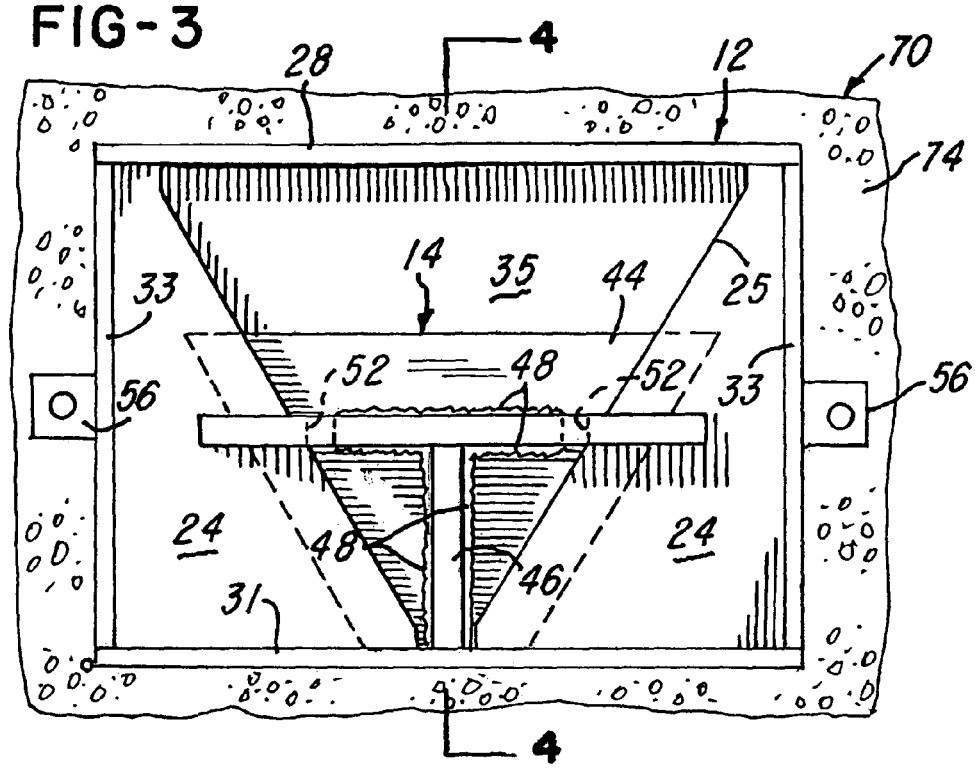
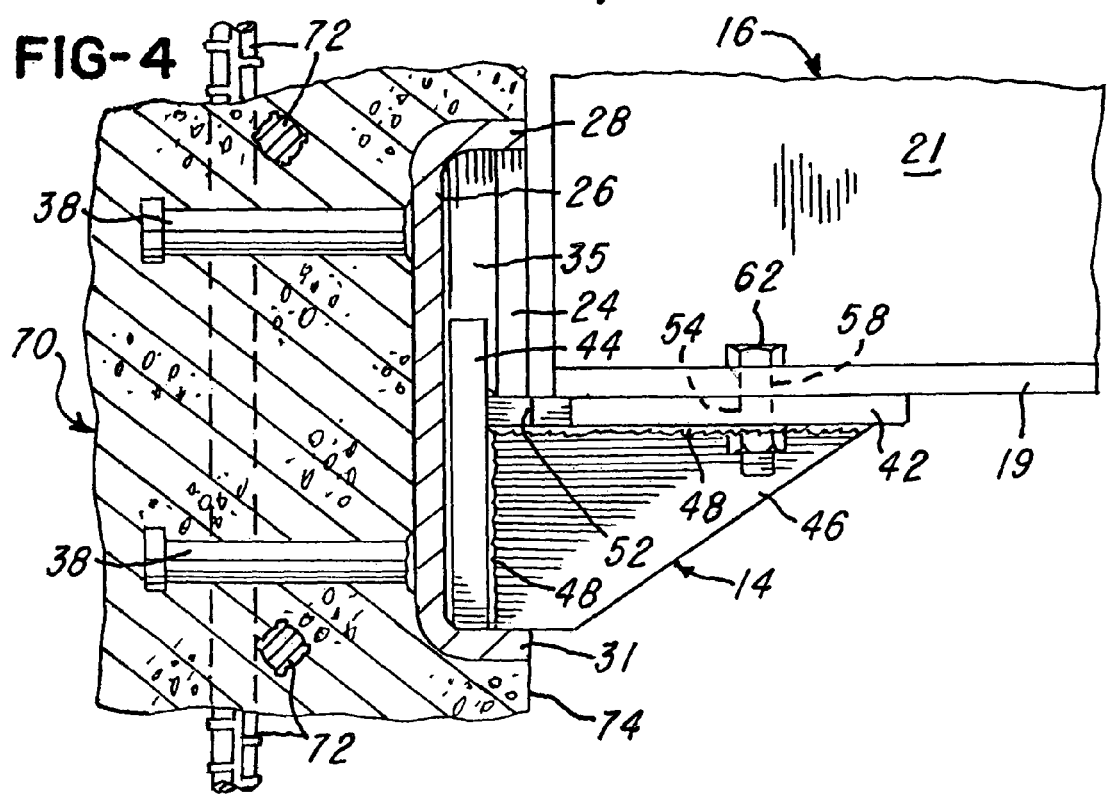

CONNECTOR SYSTEM FOR SECURING AN END PORTION OF A STEEL STRUCTURAL MEMBER TO A VERTICAL CAST CONCRETE MEMBER

BACKGROUND OF THE INVENTION

In the construction of a building or other structure, it is common to construct cast reinforced concrete walls by using tilt-up precast wall panels or panels precast at a remote plant or by casting concrete walls in place. After the vertical concrete walls are formed, it is common to connect structural steel members such as steel beams or steel truss joists to the concrete walls. Usually steel angle brackets are attached to the walls, for example, as disclosed in U.S. Pat. No. 5,881, 519, No. 6,298,630 and No. 6,739,099. Other forms of embedded connectors are disclosed, for example, in U.S. Pat. No. 4,951,438, No. 5,548,939 and No. 6,494,639. In the '639 Patent, a vertical plate is secured to a concrete wall surface by headed concrete anchors and defines keyhole slots for receiving headed studs or pins which project from an angle bracket. The angle bracket is used to support an end portion of a beam and is also used to attach a wall panel to a concrete floor having an embedded plate with headed concrete anchors as shown in the patent. The use of the connectors disclosed in the above patents for securing an end portion of a beam or joist to a vertical concrete wall usually requires that a worker be located at the elevated site of the connector to attach the end portion of the beam to the angle bracket or to connect the angle bracket to a plate secured to the wall. This requires the worker to climb a ladder extending to the wall connector or to a scaffold adjacent the wall or use a hydraulic lift, all of which requires additional time and expense for connecting a beam or joist to a wall and sometimes places the worker in an unsafe situation.

SUMMARY OF THE INVENTION

The present invention is directed to an improved connector system for connecting an end portion of a structural steel member, such as a steel beam or truss joist, to a vertical structural concrete member, such as a reinforced concrete column or wall, during the erection of a building or other structure. In general, the connector system of the invention includes a fabricated steel receiver which is embedded in the concrete column or wall, and concrete anchors project from the receiver into the concrete. The receiver has front wall portions defining an opening and also defines a cavity behind the front wall portions. A support bracket includes a horizontal plate which is attached to an end portion of the structural steel member while the steel member is located at ground level. The support bracket also includes a vertical plate which is adapted to be inserted through the opening within the receiver and into the cavity after the structural member is elevated. The end portion of the structural member and the bracket are then lowered slightly until opposite edge portions of the vertical plate of the support bracket shift within the cavity to a position behind the opposing front wall portions of the receiver.

In the illustrated embodiment, the front opening within the receiver and the vertical plate of the support bracket are generally triangular, and the horizontal plate of the support bracket has notches or recesses adjacent the vertical plate for receiving the front wall portions of the receiver. The connector system provides a number of advantages such as eliminating field welding during erection, avoiding the need for a worker to climb a ladder or use a hydraulic lift to a position adjacent the connector system, significantly reduces the time and cost for making a connection, provides a safe means for making a connection and simplifies the inspection and/or testing of the connection at the elevated site during erection.

Other features and advantages of the invention will be apparent from the following description, the accompanying drawings and the appended claims.

BRIEF DESCRIPTION OF THE DRAWINGS

FIG. 3 is an elevational view similar to FIG. 2 and showing the support bracket in a locked position; and FIG. 4 is a fragmentary section taken generally on the line 4-4 of FIG. 3 and showing the beam and attached support bracket in their locked position with the receiver.

DESCRIPTION OF THE ILLUSTRATED EMBODIMENT

Figure 1:
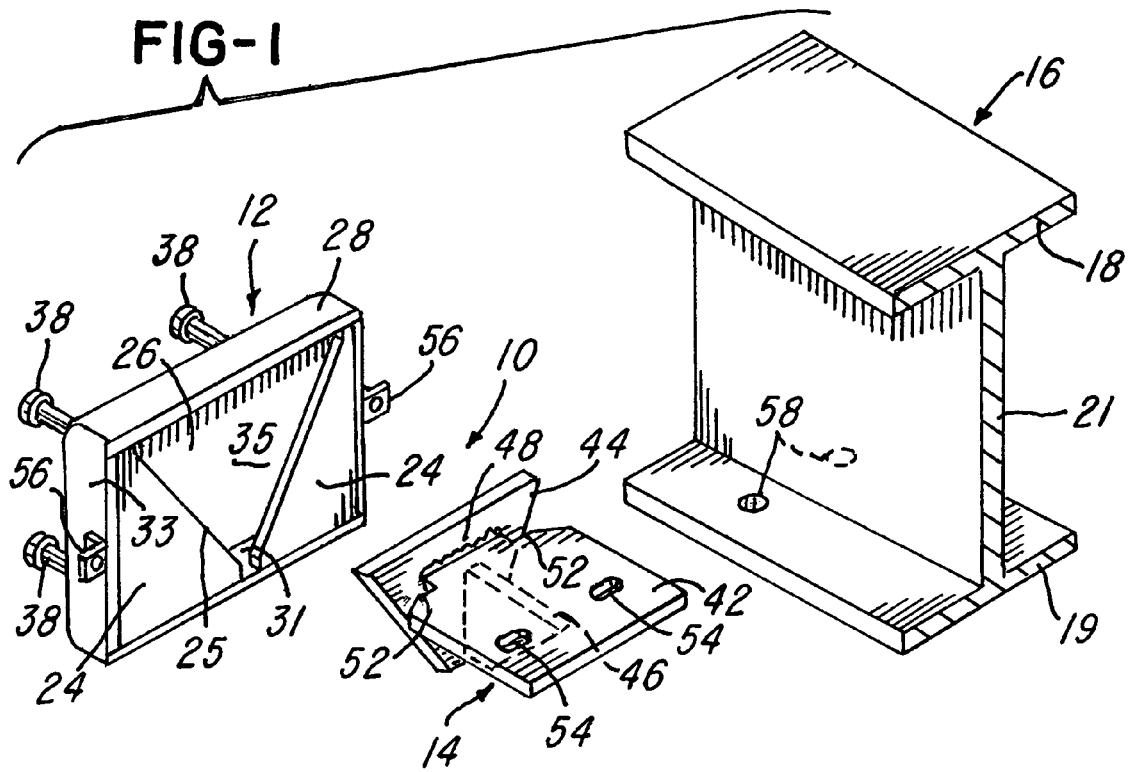
FIG. 1 is a perspective view of a connector system including a receiver and a bracket constructed in accordance with the invention and showing a fragmentary perspective view of a conventional steel structural member beam to be supported by the bracket.

Referring to FIG. 1, a connector system 10 constructed in accordance with the invention includes a fabricated metal or steel receiver 12 and a T-shape support bracket 14. The bracket 14 is adapted to receive and support an end portion of an elongated structural steel member illustrated in the form of a steel H-beam 16. However, the structural steel member may also be a steel truss joist or any other member used to construct a building or similar structure. As shown, the H-beam 16 has an upper flange portion 18 and a lower flange portion 19 integrally connected by a vertical web portion 21. As used herein, it is to be understood that the term beam includes a steel truss joist or any other structural member.

The fabricated steel receiver 12 is illustrated in the form of a box and includes opposing flat front wall portions 24 which defines a generally triangular opening 25 and is rigidly connected to a flat rear wall portion 26 by a top wall portion 28, a bottom wall portion 31 and opposite end wall portions 33. As shown in FIG. 4, the rear wall portion 26, the top wall portion 28 and the bottom wall portion 31 may be formed from a one-piece flat steel plate and welded to the front wall portions 24 and the end wall portions 33. All of the wall portions cooperate to define a chamber or cavity 35 behind the opening 25 and the front wall portions 24. A plurality of at least two headed concrete anchor studs 38 are welded to the inner or rear wall 26 for anchoring the receiver 12 in precast concrete or cast-in-place concrete, as described later. While the enclosed box-like receiver 12 prevents concrete from entering the chamber or cavity 35 during the casting of the concrete, some of the walls or part of the walls 26, 28, 31 and 33 may be reduced or omitted, and the anchors 38 welded to the front wall portions 24 or a portion of the rear wall 26, and a removable plastic foam block or pad may be temporarily used to define the cavity 35 behind the front wall portions 24 during casting of the concrete.

Figure 2:
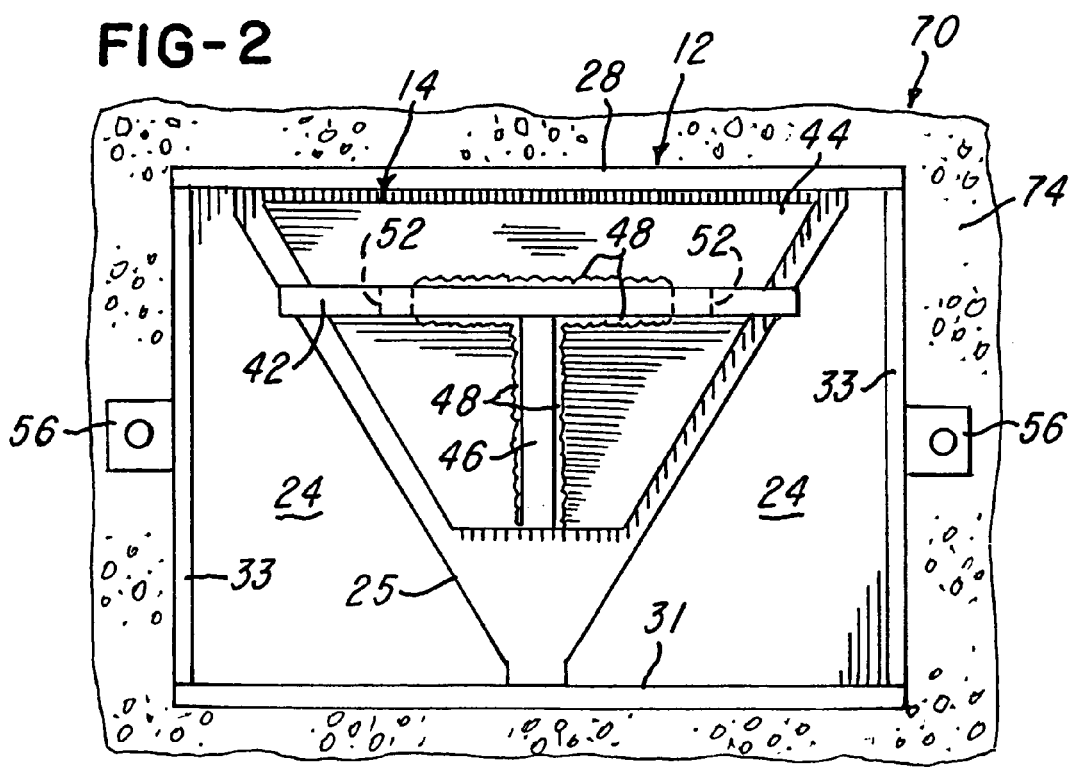
FIG. 2 is an elevational view of the receiver and bracket shown in FIG. 1 with the receiver embedded in a vertical concrete wall and with the support bracket in an insert position.

The support bracket 14 of the connector system 10 includes a horizontal support plate 42 and a vertical attachment plate 44 which are rigidly connected by a vertical gusset plate 46 and welds 48. While the horizontal plate 42 and the vertical plate 44 may be formed from a single plate or a single steel shape such as a T-shape, it is preferred that the horizontal plate 42 be welded to the vertical plate 44 below the top edge of the vertical plate for load distribution. As shown in FIG. 1, the horizontal plate 42 has opposite recesses 52 adjacent the vertical plate 44 and also horizontally spaced elongated slots 54 which extend parallel to the vertical plate 44. As also shown in FIGS. 1 & 2, the vertical plate 44 has a trapezoidal or generally triangular configuration which corresponds with the generally triangular opening 25 defined by the opposing front wall portions 24 of the receiver 12, but slightly smaller to provide clearance. FIGS. 1 & 2 also show a pair of angle mounting brackets 56 which are welded to the vertical end walls 33 of the receiver 12 and are used for attaching the receiver to concrete forms so that the front wall portions 24 of the receiver 12 are flush with the concrete surface after the forms are removed.

In use of the connector system 10, an end portion of the structural steel member or beam 16 is provided with a pair of holes 58 (FIG. 1) within the bottom flange 19, and the holes 58 align with the slots 54 in the horizontal plate 42 of the bracket 14. While the beam 16 is located close to or supported by the ground or floor surface for a building, the bracket 14 is attached to the beam 16 by a pair of bolts 62 (FIG. 4) which extend through the holes 58 in the bottom flange 19 of the beam and the slots 54 within horizontal plate 42 of the bracket 14. The slots 54 provide for horizontal or lateral adjustment between the beam 16 and bracket 14.

After the receiver 12 is embedded in a cast concrete member or wall 70, which is commonly reinforced by one or more mats of crossing vertical and horizontal concrete reinforcing bars or rebars 72 (FIG. 4), the front surfaces of the front wall portions 24 of the receiver 12 are flush with the inner vertical surface 74 of the wall 70. As mentioned above, the receiver 12 may be attached to forms located at a remote precast concrete plant or may be attached to the forms for casting concrete walls or columns in place at the building site. The receiver 12 may also be positioned within the forms for precast tilt-up wall panels by supporting the receiver 12 above the horizontal floor used for casting the tilt-up panels and by connecting the receiver to an edge form for the panels.

After the support bracket 14 is attached to the end portion of a structural steel member or beam 16, the beam is elevated, for example, by a crane until the vertical plate 44 is aligned with the opening 25 defined by the opposing front wall portions 24 of the receiver 12. The beam 16 is then shifted longitudinally and horizontally until the vertical plate 44 enters the cavity 35 after which the beam is lowered slightly by the crane until the bottom surfaces of the vertical plate 44 and the gusset 46 rest upon the bottom wall portion 31 of the receiver. In this position of the bracket 14, the opposite inclined edge portions of the vertical plate 44 are located behind or in back of the corresponding inclined opposing front wall portions 24 of the receiver 12, as shown in FIG. 3. In this locked position, the bracket 14 and beam 16 are positively secured to the cast concrete member or wall 70 with the end surface of the beam 16 adjacent the inner vertical surface 74 of the wall 70 as shown in FIG. 4. The opposite end portion of the beam 16 is then secured to its supporting steel structure in a conventional manner.

From the drawings and the above description, it is apparent that a connector system constructed in accordance with the invention provides desirable features and advantages. As one advantage, the connector system 10 does not require any welding during erection of the building, and the welding required to construct the receiver 12 and the support bracket 14 may be efficiently performed, inspected and tested at a fabricating and welding plant, thereby eliminating the requirement for inspecting and testing connector welds during erection at the building site. The connector system also avoids the need for a worker to climb a ladder or be elevated to the receiver 12 on a vertical wall, thus providing for a faster, less expensive and safer means for connecting an end portion of a structural steel member to a concrete member such as a concrete wall or column. In addition, the generally triangular opening 25 defined by the front wall portions 24 of the receiver 12 and the generally triangular vertical plate 44 of the bracket 14 with the clearance therebetween, provide for an easy to use and quick connection of a beam to a wall and a positive, high strength and reliable connection after the beam and support bracket 14 are shifted downwardly with the opposite edge portions of the vertical plate 44 behind the opposing front vertical wall portions 24 of the receiver 12, as shown in FIG. 3.

While the form of connector system herein described constitutes a preferred embodiment of the invention, it is to be understood that the invention is not limited to this precise form of the invention, and that changes made therein without departing from the scope and spirit of the invention as defined in the appended claims.

What is claimed is:

1. A connector system for securing an end portion of a steel structural support member to a vertical cast concrete wall member, said connector system comprising
    a metal receiver embedded in said concrete wall member and connected to at least one anchor member embedded in said wall member,
    said receiver including opposing vertical front wall portions positioned substantially flush with a vertical surface of said concrete wall member,
    said opposing vertical front wall portions defining a generally triangular V-shape opening between said front wall portions,
    a metal support bracket including a vertical generally triangular plate rigidly connected to a support plate rigidly connected to said end portion of said structural support member,
    said vertical triangular plate being smaller than said V-shape opening and adapted to be inserted horizontally through said opening into a cavity in back of said front wall portions,
    said generally triangular V-shape opening and said cavity providing for shifting said vertical triangular plate of said support bracket downwardly within said cavity after said vertical triangular plate is inserted horizontally into said cavity, and
    said opposing vertical front wall portions of said receiver overlap and block elongated opposite edge portions of said vertical triangular plate of said support bracket in a locked position after said vertical triangular plate is shifted downwardly within said cavity.

2. A connector system as defined in claim 1 wherein said support plate of said support bracket is horizontal and has horizontally spaced recesses adjacent said vertical triangular plate, and said recesses receive said vertical front wall portions of said receiver when said support bracket shifts downwardly to said locked position.

3. A connector system as defined in claim 2 wherein said horizontal support plate of said support bracket is welded to said vertical triangular plate of said support bracket, and a vertical metal reinforcing gusset plate is welded to said horizontal support plate and to said vertical triangular plate.

4. A connector system as defined in claim 2 wherein said horizontal support plate of said support bracket has a plurality of horizontally spaced slots extending horizontally parallel to said vertical triangular plate, and said slots receive bolts for adjustably connecting said horizontal plate to said end portion of said structural support member.

5. A connector system as defined in claim 1 wherein each of said opposing vertical front wall portions of said receiver is generally triangular in configuration.

6. A connector system as defined in claim 1 wherein said receiver comprises a horizontal bottom wall rigidly connected to said opposing front wall portions and positioned to support said vertical triangular plate of said support bracket in said locked position.

7. A connector system for securing an end portion of a steel structural support member to a vertical cast concrete wall member, said connector system comprising a metal receiver embedded in said concrete wall member and connected to at least one anchor member embedded in said wall member, said receiver including opposing vertical front wall portions positioned substantially flush with a vertical surface of said concrete wall member, said opposing vertical front wall portions defining a generally triangular V-shape opening between said front wall portions, a metal support bracket including a vertical generally triangular plate rigidly connected to a horizontal support plate rigidly connected to said end portion of said structural support member, said vertical triangular plate being smaller than said V-shape opening and adapted to be inserted through said opening into a cavity in back of said front wall portions, said generally triangular V-shape opening and said cavity providing for shifting said vertical triangular plate of said support bracket downwardly within said cavity after said vertical triangular plate is inserted into said cavity, said opposing vertical front wall portions of said receiver overlap and block opposite edge portions of said vertical triangular plate of said support bracket in a locked position after said vertical triangular plate is shifted downwardly within said cavity, and said horizontal support plate of said support bracket has horizontally spaced recesses adjacent said vertical triangular plate, and said recesses receive said vertical front wall portions of said receiver when said support bracket shifts downwardly within said cavity to said locked position.

8. A connector system as defined in claim 7 wherein said horizontal support plate of said support bracket is welded to an upper portion of said vertical triangular plate of said support bracket, and a vertical metal reinforcing gusset plate is welded to a bottom surface of said horizontal support plate and to said vertical triangular plate.

9. A connector system as defined in claim 7 wherein said horizontal support plate of said support bracket has a plurality of horizontally spaced slots extending horizontally parallel to said vertical triangular plate, and said slots receive bolts adjustably connecting said horizontal support plate to said end portion of said structural support member.

10. A connector system as defined in claim 7 wherein said receiver comprises a horizontal bottom wall rigidly connected to said opposing front wall portions and positioned to support said vertical triangular plate of said support bracket in said locked position.

\* \* \* \* \*